United States Patent [19]
Eckel et al.

[11] Patent Number: 5,777,837
[45] Date of Patent: Jul. 7, 1998

[54] THREE WIRE AIR GAP OFF POWER SUPPLY CIRCUIT FOR OPERATING SWITCH AND REGULATING CURRENT WHEN SWITCH OR LOAD IS OPEN

[75] Inventors: David Philip Eckel, Wetherfield; Thomas James Batko, Wallingford, both of Conn.

[73] Assignee: Hubbell Incorporated, Orange, Conn.

[21] Appl. No.: 501,850

[22] Filed: Jul. 13, 1995

Related U.S. Application Data

[63] Continuation-in-part of Ser. No. 412,502, Mar. 29, 1995, which is a continuation of Ser. No. 382,691, Feb. 2, 1995, abandoned.

[51] Int. Cl.$^6$ .................................................. H01H 47/22
[52] U.S. Cl. ............................................. 361/160; 307/125
[58] Field of Search ................................ 361/153, 160, 361/170; 307/126, 140, 116, 154, 157, 326, 327, 328, 125, 65; 315/91–93, 135, 136, 174, 175, 205, 207, 272, 273, 352, 353, 86; 323/245; 340/333

[56] References Cited

U.S. PATENT DOCUMENTS

| | | | |
|---|---|---|---|
| 4,340,826 | 7/1982 | Muchnick | 307/157 |
| 4,367,510 | 1/1983 | Watanabe | 361/160 |
| 4,433,356 | 2/1984 | Wyatt | 361/191 |
| 4,656,365 | 4/1987 | Billings | 307/140 |
| 4,713,598 | 12/1987 | Smith | 323/245 |
| 4,874,962 | 10/1989 | Hermans | 307/116 |
| 5,457,595 | 10/1995 | Baldwin | 361/160 |
| 5,508,878 | 4/1996 | Pecore | 361/195 |

OTHER PUBLICATIONS

Product Brochure For Hubbell H. Moss Passive Infrared Wall Switch Sensor Models 1500A & 750A, 1993, USA.

*Primary Examiner*—Fritz Fleming
*Attorney, Agent, or Firm*—Jerry M. Presson; Stacey J. Longanecker

[57] ABSTRACT

A three wire power supply circuit is provided for selectively connecting and disconnecting a load from an alternating current power source having neutral, line and ground conductors. The load is connected to the neutral conductor. The power supply circuit is provided with a relay connected at one terminal to the load and at another terminal to the line conductor, a control circuit connected to the relay and operable to open and close the relay, a first rectifier circuit connected in parallel with the relay and operable to supply as much as full line power to the control circuit when the relay is open, and a second rectifier circuit connected at one terminal to the line conductor and connected at another terminal to the ground conductor. The second rectifier circuit is operable to supply power to the control circuit regardless of the position of the relay. An air gap switching mechanism is connected to the relay and the control circuit and operable to open the relay when the air gap switching mechanism is activated. The power supply circuit is operable to provide pulsed power versus steady state power to selected circuit components that require more power than that available via a regulated supply.

36 Claims, 13 Drawing Sheets

5,777,837

1

THREE WIRE AIR GAP OFF POWER SUPPLY CIRCUIT FOR OPERATING SWITCH AND REGULATING CURRENT WHEN SWITCH OR LOAD IS OPEN

This application is a continuation-in-part of U.S. Pat. application Ser. No. 08/412,502, filed Mar. 29, 1995, which is a continuation of U.S. Pat. application Ser. No. 08/382,691, filed Feb. 2, 1995 (abandoned); the entire subject matter of which is hereby incorporated herein by reference for all purposes.

FIELD OF THE INVENTION

The invention relates to three wire electrical power supply circuits for connecting a load to an alternating current (AC) power source and supplying power to a load switching element when the load is disconnected from the power source. The invention also relates to power supply circuits which limit line to load current and line to ground current.

BACKGROUND OF THE INVENTION

A number of electrical power supply circuits such as wall switch units for lighting fixtures are potentially hazardous to individuals (e.g., repairmen). They comprise an ON/OFF switch or other identified or implied OFF function which most users assume isolates the circuit from the power source when the switch is off. In other words, a user may assume during servicing and maintenance that there are no live parts on the load side of the power supply circuit while the power supply circuit is in the identified OFF mode.

Until recently, safety requirements under Underwriters Laboratories (UL) standard 773 for nonindustrial photoelectric switches for lighting control have not been as stringent as requirements for other electric control circuits in different environments, and most ON/OFF switches and OFF mode identifying functions have been in compliance with UL 773. New safety standards have been devised, however, under the newly proposed UL 773A standard which requires an air gap switch in these types of electrical circuits. The newly proposed UL 773A standard requires that a power supply circuit incorporate either an air gap switch, or a solid-state switching device which restricts leakage currents to 0.5 milliamperes or less back to the load.

U.S. Pat. No. 4,713,598 discloses a power supply circuit 36 which comprises a current transformer XFR to derive operating current, as shown in FIGS. 1A and 1B. The primary winding W1 of the transformer XFR is in series with a switching mechanism SW (e.g., a relay). When the switching mechanism SW is closed, current flows through the primary winding W1 and is induced in the secondary winding W2. Voltage across the secondary winding W2 provides operating power via a power supply 42 (i.e., diode CR1 and capacitor C1) for the control circuitry 44 (i.e., sensor S and amplifier AMP). When the switching mechanism is open, the voltage differential for deriving operating current is across the secondary winding W2 to operate a power supply 42.

One of the drawbacks of this design is possible noncompliance with the newly proposed UL 773A safety standard. When the relay SW is open, the device 36 is still electrically connected to the AC source via the capacitor C2 and the secondary winding W2. When analyzed with electronic test equipment, it can be found on some devices that a 2.5 milliamp current flows through the secondary winding W2 of the transformer XFR even though the switching mechanism SW is in the OFF or open position and the load (e.g.,

2 a lamp) is no longer energized by the power source. Further, the device 36 does not appear to comprise energy or memory storage means for interrupting the full line to load current path when the load has been opened prior to the device 36 being put in an OFF position by, for example, a slide switch (not shown) or other identified or implied OFF switch. Thus, if the switch SW is a latching relay, and the lamp has burned open, it appears that a repairman could be exposed to full AC line current (e.g., 15 amperes). This is because the power supply circuit in FIGS. 1A and 1B does not provide means for changing the state of the switch SW, that is, no identified or implied OFF switch is provided to either directly or indirectly open the current path to the load. The lamp, therefore, is actually powered on until the relay SW is opened, regardless of whether the slide switch is placed in the OFF position. In addition, current transformers also have a minimum load requirement. Thus, a need exists for a power supply circuit which complies with the newly proposed UL 773A standard.

SUMMARY OF THE INVENTION

The disadvantages and deficiencies of existing power supply circuits are overcome by the present invention. In accordance with an aspect of the invention, a three wire power supply circuit is provided for selectively connecting and disconnecting a load from an alternating current power source having neutral, line and ground conductors, the load being connected to the neutral conductor, which comprises a relay connected at one terminal to the load and at another terminal to the line conductor, a control circuit connected to the relay and operable to open and close the relay, a first rectifier circuit connected in parallel with the relay and operable to supply as much as full line power to the control circuit when the relay is open, and a second rectifier circuit connected at one terminal to the line conductor and connected at another terminal to the ground conductor, the second rectifier circuit being operable to supply power to the control circuit.

In accordance with another embodiment of the invention, the power supply circuit is provided with an air gap off switch.

In accordance with yet another embodiment of the invention, the power supply circuit can provide circuit components with steady state power or with selectively pulsed power to both the load and ground.

BRIEF DESCRIPTION OF THE DRAWINGS

These and other features and advantages of the present invention will be more readily apprehended from the following detailed description when read in connection with the appended drawings, which form a part of this original disclosure, and wherein.

DETAILED DESCRIPTION OF THE PREFERRED EMBODIMENTS

Figure 1A:
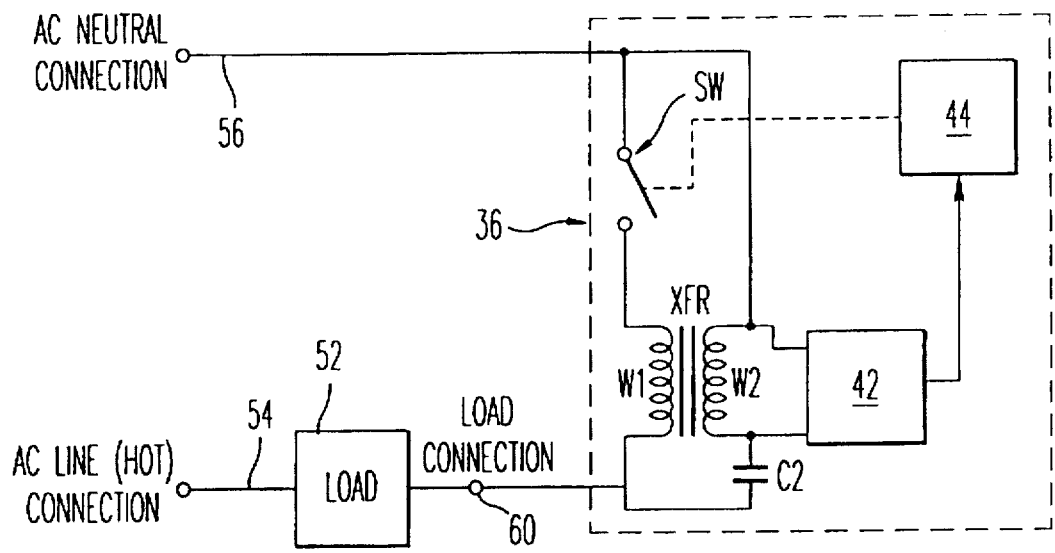
FIGS. 1A and 1B are schematic block diagrams of a prior art power supply circuit.
Figure 1B:
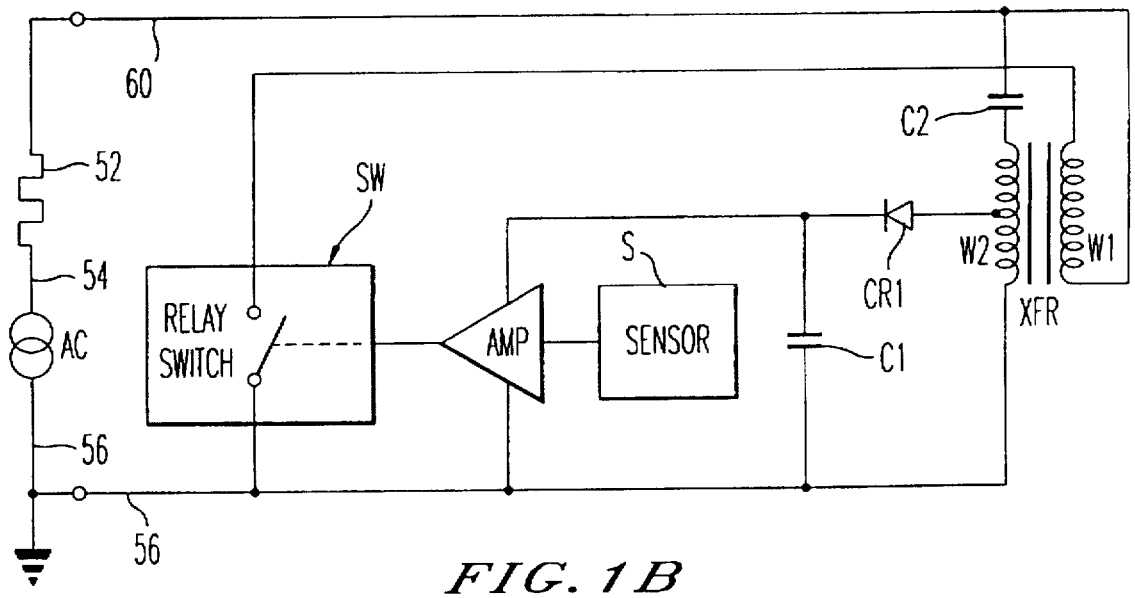
Figure 2:
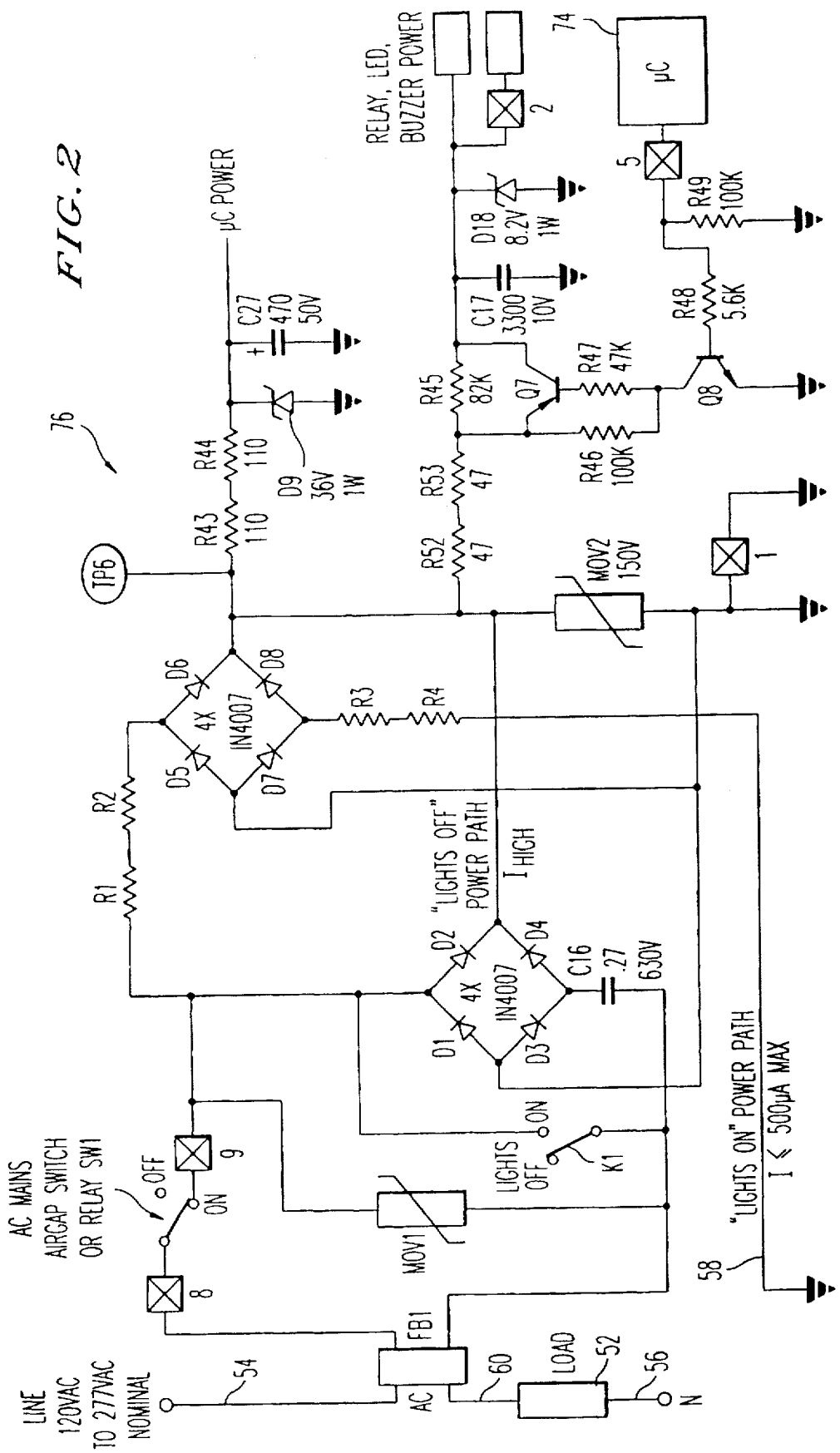
FIGS. 2 through 14 are schematics of three wire air gap off power supply circuits constructed in accordance with respective embodiments of the present invention.

FIG. 2 depicts a power supply circuit 76 constructed in accordance with an embodiment of the present invention. The power supply circuit 76 connects a load such as a lighting fixture to an AC power source. The load is connected to the neutral conductor 56 of an AC power source.

The power supply circuit 76 is connected through a ferrite bead FB1 to the load via a load conductor 60, and to the AC power source via the AC power or hot line conductor 54.

With continued reference to FIG. 2, the power supply circuit 76 comprises a switch mechanism K1 for controllably completing or interrupting the current path between the line or power conductor 54 and the return path to the AC power source, i.e., the load conductor 60, the load 52 and the neutral conductor 56. The switch mechanism K1 can be, but is not limited to, a slide switch, a press switch, a relay, a semiconductor switch, an optocoupler, a thyristor, or any other mechanical, electromechanical or electronic device for opening and closing a circuit. The switching mechanism can be controlled manually (e.g., a press button or slide switch), or by an electronic control circuit which can include, but does not require, a microcontroller. For example, the relay K1 of the power supply circuit 76 can be switched to the ON position by a microcontroller 74 to provide power to the load, and to the OFF position to power down the load. A rectifier circuit D5 through D8 and resistors R1 through R4 are connected in series with the line and ground conductors 54 and 58, respectively. The rectifier circuit D5 through D8 supplies power to relay control circuitry, which is described below, when the relay is open.

With continued reference to FIG. 2, full line voltage appears across the rectifier circuit D1 through D4 and capacitor C16 when the relay K1 is open and the load (e.g., a lighting fixture) is off. Full line voltage appears across the other rectifier circuit D5 through D8 and resistors R1, R2, R3 and R4 and the ground conductor when the load is on (i.e. relay K1 is closed), as well as when the load is off. Thus, the lamp can be open (e.g., burned out) or absent, and the power supply circuit can still operate (e.g., activate the relay K1). The rectifier circuit D5 through D8 and resistors R1, R2, R3 and R4 limit the unpulsed line to ground current to a predetermined limit such as 0.5 milliamperes as defined by the newly proposed UL 773A standard. This line to ground current is preferably only interrupted when an air gap switch SW1 is open and the AC power source is disconnected from the power supply circuit 76. This alternate line to ground circuit allows for the device to derive power when the relay K1 is ON (i.e., closed) or a lamp load is open. The air gap switch SW1 can be, but is not limited to, a slide switch, a press switch, a relay, a semiconductor switch, an optocoupler, a thyristor, or any other mechanical, electromechanical or electronic device for opening and closing a circuit. The air gap switch SW1 can be controlled manually (e.g., a press button or slide switch), or by an electronic control circuit which can include, but does not require, a microcontroller.

The power supply circuit 76 in FIG. 2 is in effect a hybrid two and three wire power supply circuit. The rectifier circuit D1 through D4 and the capacitor C16 provide a parallel supply path to the 0.5 milliampere current from the line to ground current path (i.e., resistors R1, R2, R3 and R4 and rectifier circuit D5 through D8) when the load is off via an open relay K1. The circuit 76 is therefore operating as a three wire power supply circuit. When the load is on, rectifier circuit D1 through D4 and capacitor C16 supply virtually no power, and the line to ground current is fixed at, for example, 0.5 milliamperes. The load or lighting fixture, therefore, receives virtually full input power (e.g., 120 volts) when the relay K1 is closed. The circuit 76 in this case is operating as a two wire power supply circuit, and it complies with the newly proposed UL 773A standard. Nevertheless, an air gap switch SW1 can be provided at the AC main to operate as a true, mechanical open circuit when the relay is in the OFF position.

The circuit 76 is advantageous because it can provide a low input impedance and therefore low voltage drop across the AC mains and the switch K1 when the load is on (i.e., the switch is closed). The switch K1 also operates in a high impedance state and therefore creates a high voltage drop across the AC mains when the load is off (i.e., the switch K1 is open). A rectifier circuit (e.g., bridge rectifier D1 through D4) is provided to rectify the voltage in this case. The circuit comprises an air gap off circuit (i.e., the switch SW1, which can be, for example, a form C relay) for rectifying the secondary (i.e., the line to load current path) of the circuit 76 when the load is present but off. A rectifier circuit (e.g., bridge rectifier D5 through D8) is provided to rectify the voltage in the line to ground current path when the load is open or the switch K1 is closed.

The circuit in FIG. 2 is advantageous because it complies with safety standards without consuming voltage between the line and the load. The power supply circuit 76 depicted in FIG. 2 is also advantageous because it can also provide pulsed power versus steady state power to circuit components requiring more power than a 5 volt regulated supply (e.g. the relay K1, a buzzer or a light emitting diode (LED)) in accordance with a signal generated by a microcontroller 74. The bridge rectifier circuits D5 through D8 and D1 through D4 therefore are not required to provide high, continuous current on their own. The resistors R43 and R44, the diode D9 and the capacitor C27 regulate the output of the rectifier circuit D5 through D8 to provide a regulated DC voltage (e.g., 5 volts to the microcontroller). Pulses, however, are generated as needed by the microcontroller after the relay K1, or, for example, an LED or a buzzer, are energized so that a capacitor C17 can be recharged. They can also be controllably derived or programmed to happen at fixed or varying intervals or duty cycles. When the microcontroller asserts a pulsed signal (e.g., a 5 volt signal, or a low signal if transistor Q8 is a PNP-type transistor) to the transistor Q8, the transistors Q7 and Q8 conduct and therefore shunt higher current around the resistor R45 to the capacitor C17 for a fast charge for discharging at a later time when, for example, an 8.2 volt supply is needed to energize a component such as the relay K1. The diode D18 shunt regulates 8.2 volts to limit the voltage within operational ratings of the capacitor C17 and other loads. The power supply circuit allows increased line side or lighting fixture load, while decreasing the current drawn from the rectifier circuits. The capacitor C16 is preferably selected to limit line to load voltage to 120 V and current to 2 or 3 milliamperes or other desired current level. Further, the resistor R45 can be a high or low impedance, depending on the trickle charge needs of the device being energized.

Figure 3:
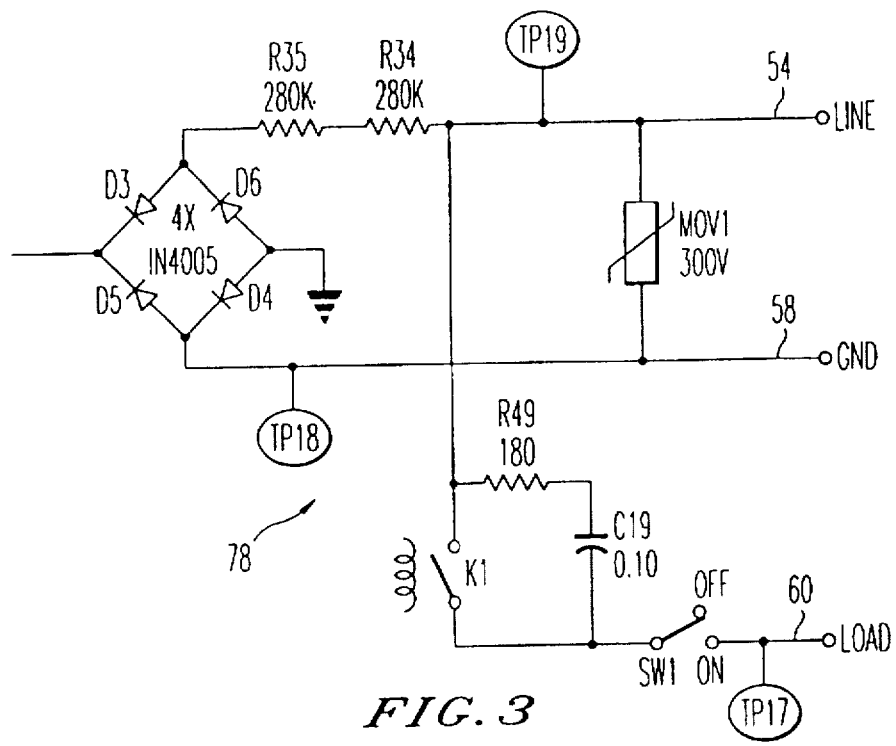
Figure 4:
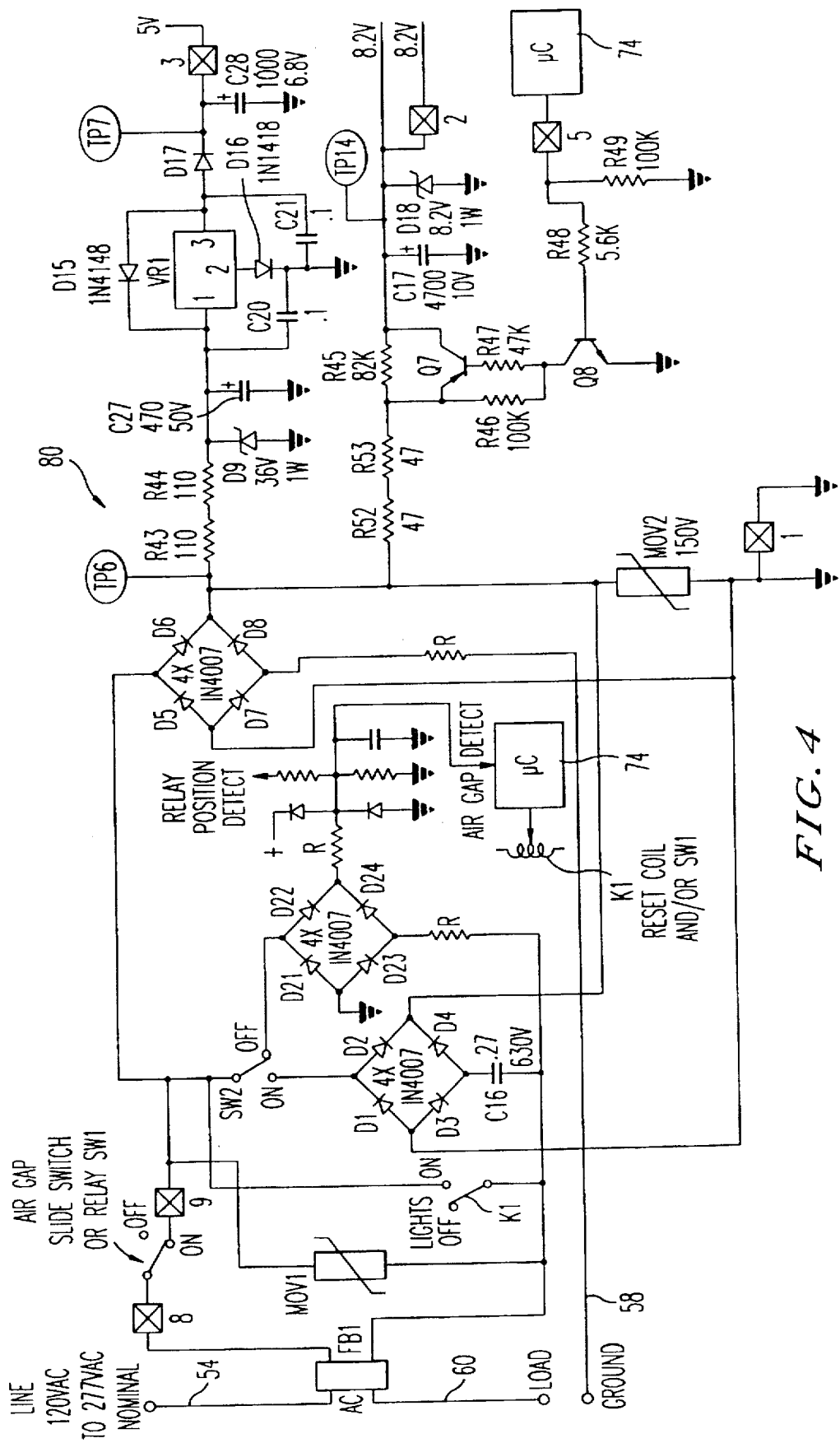
Figure 5:
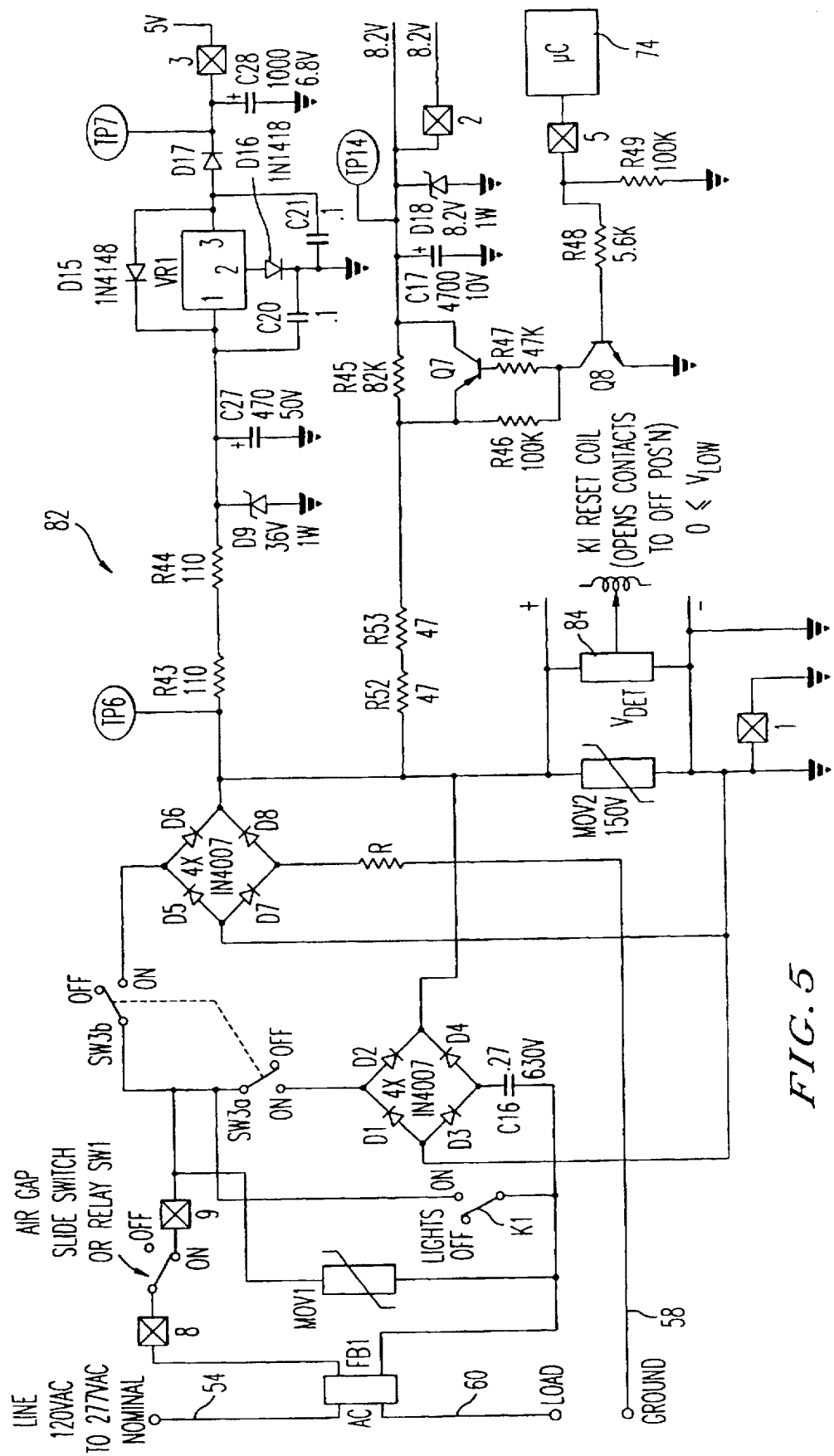
Figure 6:
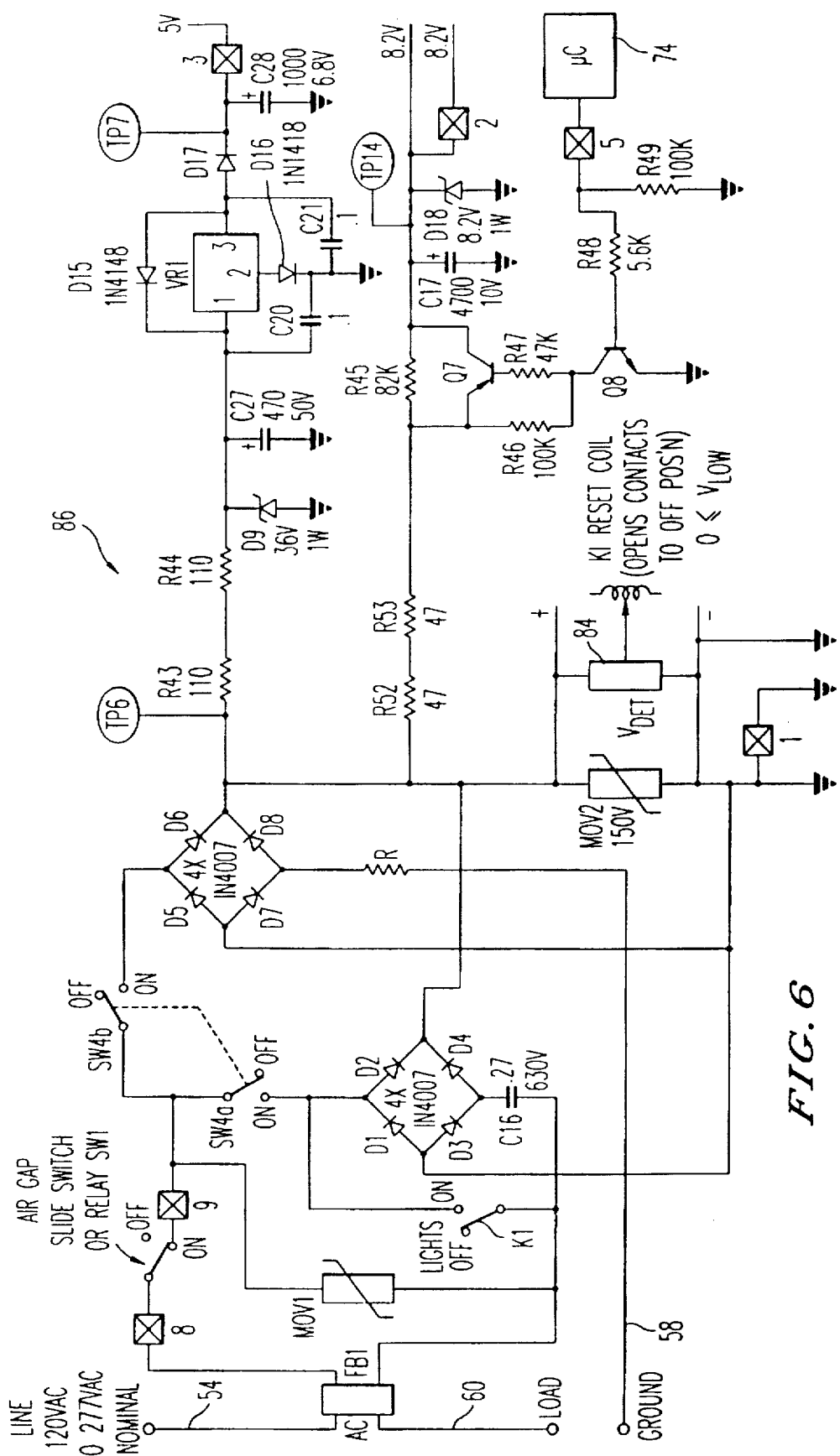

FIG. 3 depicts a power supply circuit 78 constructed in accordance with another embodiment of the present invention wherein the air gap switch SW1 (e.g., a slide switch or a press button) is located on the load conductor, as opposed to the power or hot line conductor (FIGS. 4, 5 and 6). The relay K1 can be driven open via the microcontroller when the microcontroller 74 receives a signal indicating that switch SW1 has been activated.

Unlike the circuit depicted in FIG. 2, the power supply circuit 80 in FIG. 4 comprises a voltage regulator VR1 for regulating the voltage output to 5 volts, for example, for the microcontroller 74. As shown in FIGS. 2 and 4, resistors and/or capacitors can be placed on either side of or on both sides of the bridge rectifier D5 through D8 to regulate its output voltage. In addition, resistors and capacitors can be placed on either side of or on both sides of bridge rectifier D5 through D8, bridge rectifier D1 through D4, bridge rectifier D3 though D6 and bridge rectifier D21 through D24, which are depicted in different ones of FIGS. 2 through 14, to regulate output voltage. Although the bridge rectifiers depicted in the various views are illustrated as full-wave rectifiers, it is to be understood that half wave-rectifiers can be used.

In accordance with another embodiment of the present invention, the power supply circuit 80 can comprise another bridge rectifier D21 through D24 and an air gap switch SW2 between the line and load conductors, as depicted in FIG. 4. Alternatively, an air gap slide or relay switch SW1 can be used as described above. If the air gap slide switch or relay SW1 is on, or the air gap switch SW2 is on, the power supply circuit operates in substantially the same manner as the circuit depicted in FIG. 2. The bridge rectifier circuit D1 through D4 provides a power path for the relay control circuitry when the load is off but present, and the bridge rectifier circuit D5 through D8 limits the line to ground current when the load is on or open.

With continued reference to FIG. 4, if the air gap slide switch or relay SW1 is open, the power supply circuit receives no power from the AC power source. Alternatively, if the switch SW2 is in the OFF position, the bridge rectifier circuit D21 through D24 is energized. Accordingly, the microcontroller 74 can detect that the switch SW2 is off and open the relay K1.

In accordance with another embodiment of the present invention, a power supply circuit 82 can be provided with an air gap slide or relay switch SW1, or a double-pole, double-throw switch SW3 in series with both bridge rectifiers D1 through D4 and D5 through D8, as shown in FIG. 5, in lieu of the switch SW2 in FIG. 4. If the switch SW3 is switched to an OFF position, the power supply circuit is powered down. A low voltage drop out detector 84 in turn detects a drop in voltage and switches the relay K1 and/or switch SW1 to an open position. Thus, a repairman who switches the power supply circuit to OFF is ensured that the load is not energized because the voltage detector circuit 84 and microcontroller switch the relay K1 and/or switch SW1 to open when a drop in voltage is detected. Switch SW3 can also be a single-pole, double-throw switch.

The power supply circuit 86 in FIG. 6 is substantially the same as the power supply circuit 82 in FIG. 5 except that a high current-type switch is used. In contrast, a low current-type switch is used with the circuit of FIG. 5. The switch SW4a in FIG. 6 interrupts the line to load current path when the load is powered on. The switch in FIG. 5 can be rated for lower current because it is located along a current path with a higher impedance when the load is powered on.

Figure 7:
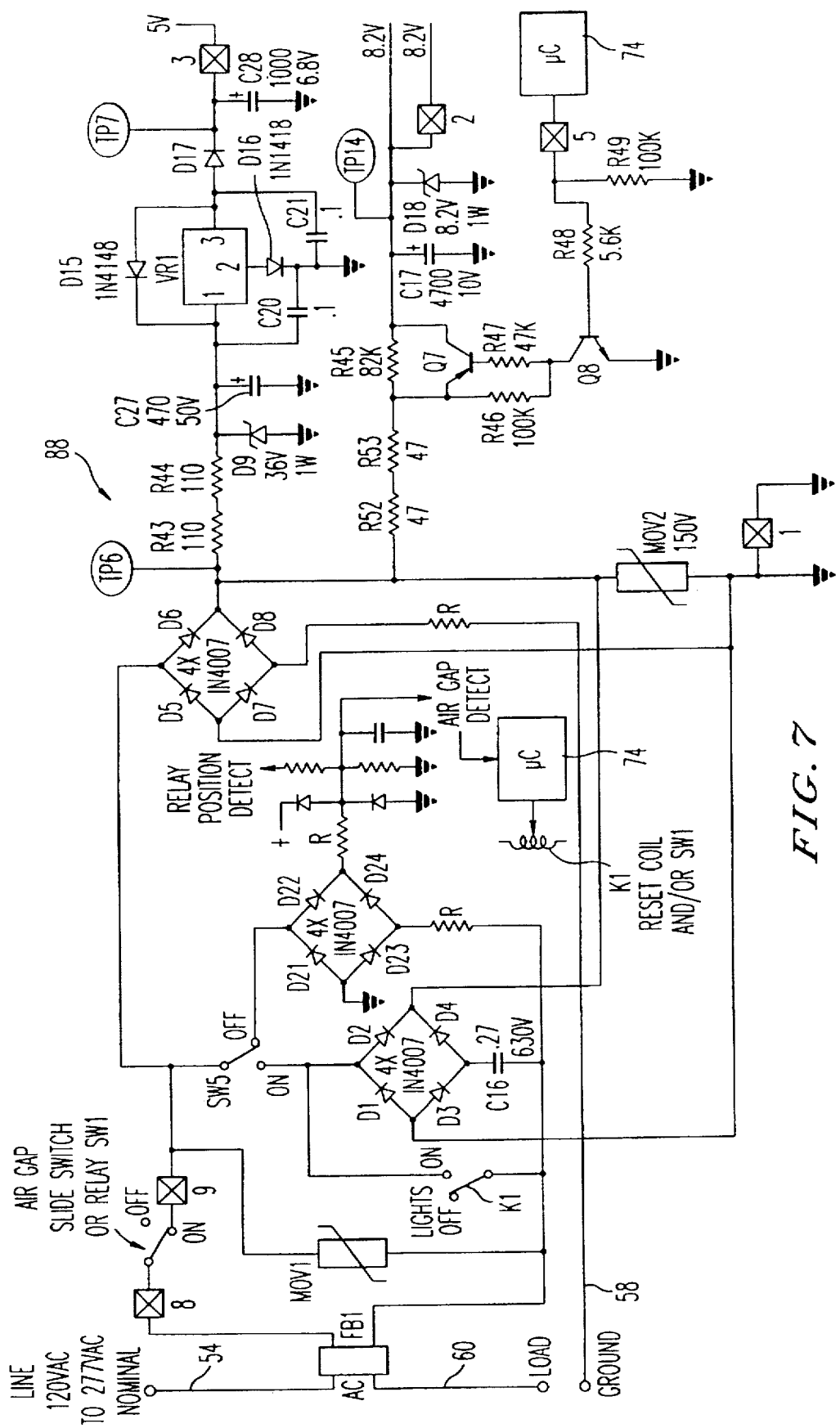

Similarly, the power supply circuit 88 in FIG. 7 is substantially the same as the power supply circuit in FIG. 4 except that a high current-type switch SW5 is used, whereas a low current-type switch SW2 is used with the circuit of FIG. 4. The switch SW2 in FIG. 4 can be rated for lower current because it is located along a current path with higher impedance, when the load is powered on, than the switch SW5 in FIG. 7.

Figure 8:
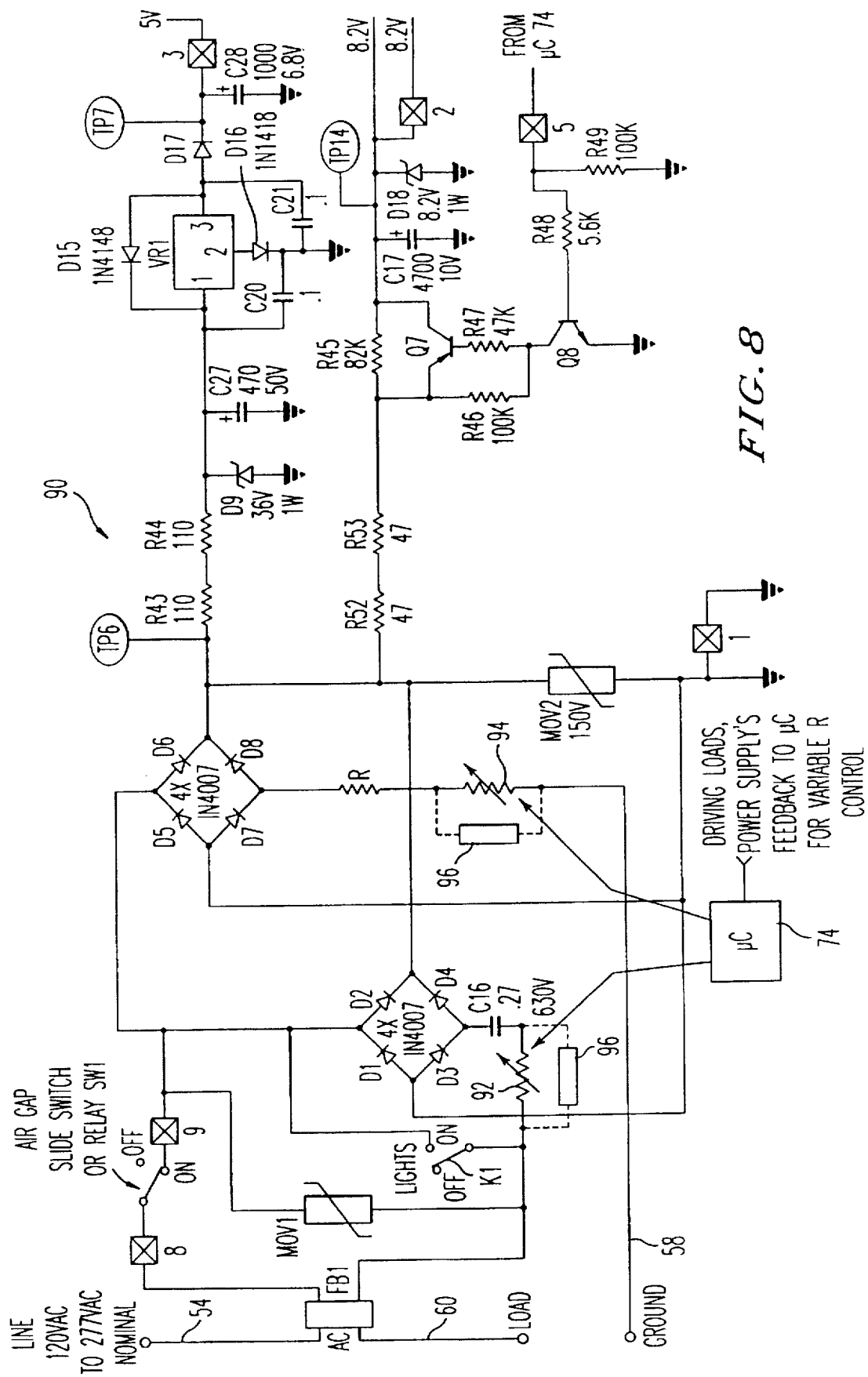

FIG. 8 illustrates a power supply circuit 90 constructed in accordance with an embodiment of the invention wherein at least one variable resistor is used in conjunction with the microcontroller 74 to limit current to an acceptable level (e.g., not more than 0.5 milliamperes as specified in the newly proposed UL 773A standard) electronically, as opposed to using a mechanical air gap off switch. A variable resistor 92 can be connected to rectifier circuit D1 through D4 to limit line to load current. Alternatively, a variable resistor 94 can be connected to rectifier circuit D5 through D8 to limit line to ground current. As a further alternative, both variable resistors 92 and 94 can be provided in the power circuit to limit current in both the line to load and line to ground current paths, respectively. The variable resistors 92 and 94 can be provided on either side of the associated bridge rectifier. A variable resistor or varying impedance used in conjunction with a power supply circuit in accordance with the present invention can be a potentiometer, a varying impedance of an electronic device in which impedance is variable and controllable, or an electronic device which is operates in a variable impedance range, regardless of whether the varying impedance is linear or nonlinear.

With continued reference to FIG. 8, each variable resistor 92 and 94 can be a potentiometer which is adjusted without microcontroller control. Alternatively, each variable resistor can be separate from and adjusted by a mechanically adjustable circuit element such as a potentiometer 96. As a further alternative, the impedance provided by each variable resistor can be changed to accommodate various different and dynamic situations by a microcontroller 74, depending on the type of feedback signals the microcontroller is receiving. For example, a single power supply circuit can be configured for use with either of two different input voltages such as 120 volts and 277 volts. The microcontroller 74 adjusts the variable resistor automatically or depending on an input signal received from a press button (not shown) operated by a user to select one of the two input voltages.

Figure 9:
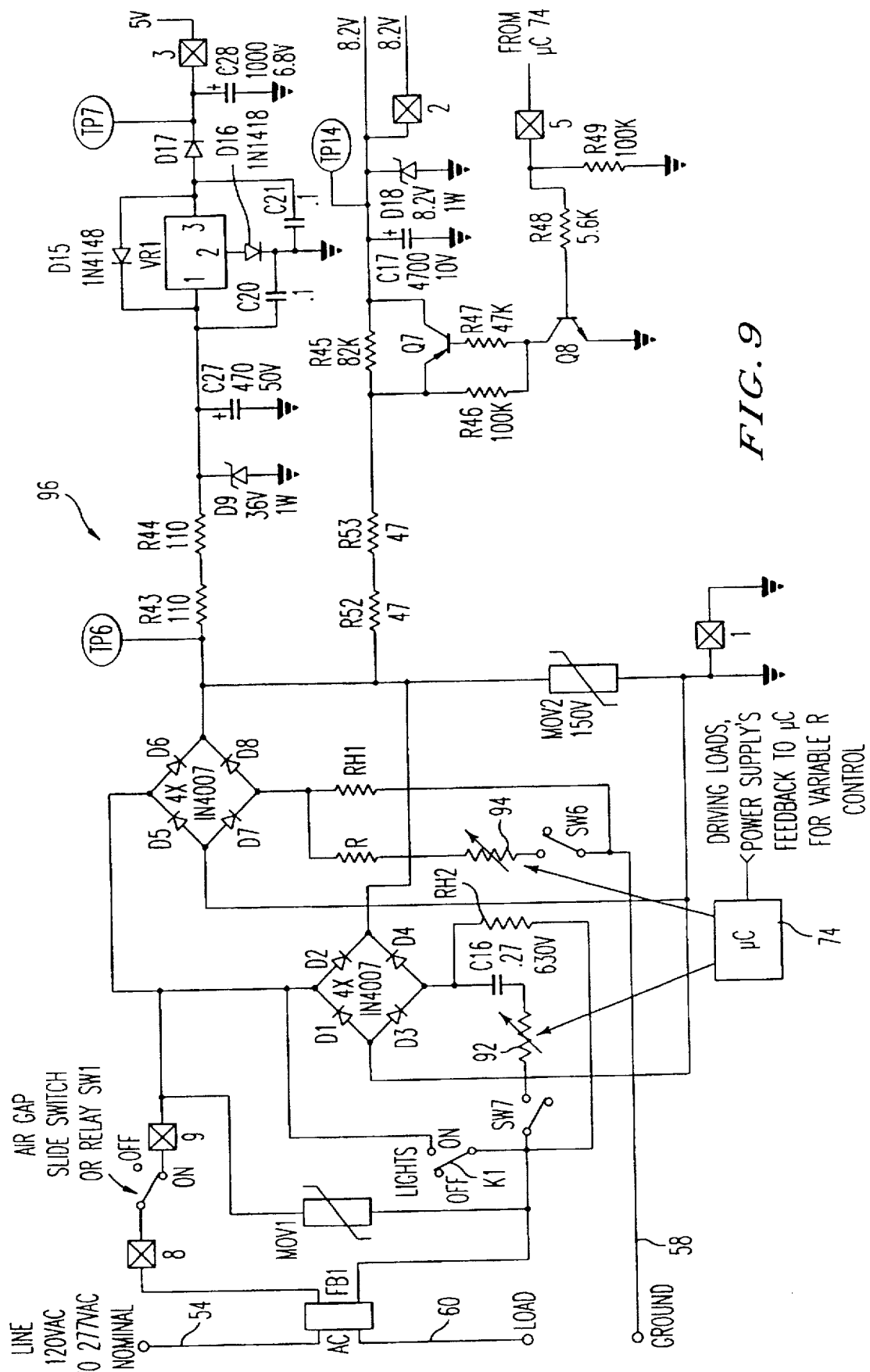

FIG. 9 illustrates a power supply circuit 96 constructed in accordance with another embodiment of the invention employing variable resistors 92 and 94. The variable resistors 94 and 92 are used in conjunction with the microcontroller 74 to control mechanical or electromechanical switches SW6 and SW7, respectively. The power supply circuit 96 comprises resistors $R_{H1}$ and $R_{H2}$, the values of which are preferably selected to limit current in the line to ground and line to load current paths, respectively. Thus, current in the line to ground and line to load current paths can be fixed to a maximum of 0.5 milliamperes, for example. In addition, two parallel paths are provided. The first parallel path comprises a resistor $R_L$ in series with the variable resistor 94 and the switch SW6. The second parallel path comprises the capacitor C16 in series with the variable resistor 92 and a switch SW7. If greater current flow is desired in the line to ground and/or line to load paths than that allowed by resistors $R_{H2}$ and $R_{H1}$, the microcontroller 74 can be programmed to close one or both of the switches SW6 or SW7 to lower the impedance of one or both of these parallel paths via the corresponding variable resistor. Further, the power supply circuit 96 can be configured with only a single variable resistor in series with a switch to provide a parallel path with only one of the line to ground and line to load paths.

Figure 10:
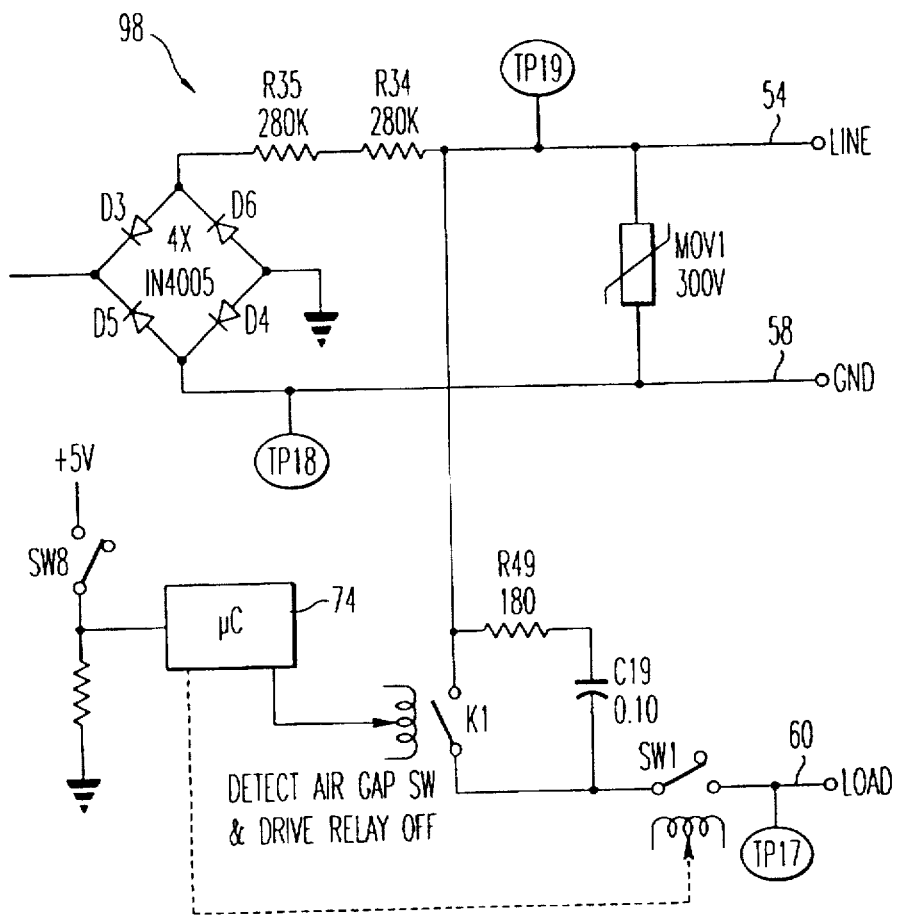
Figure 11:
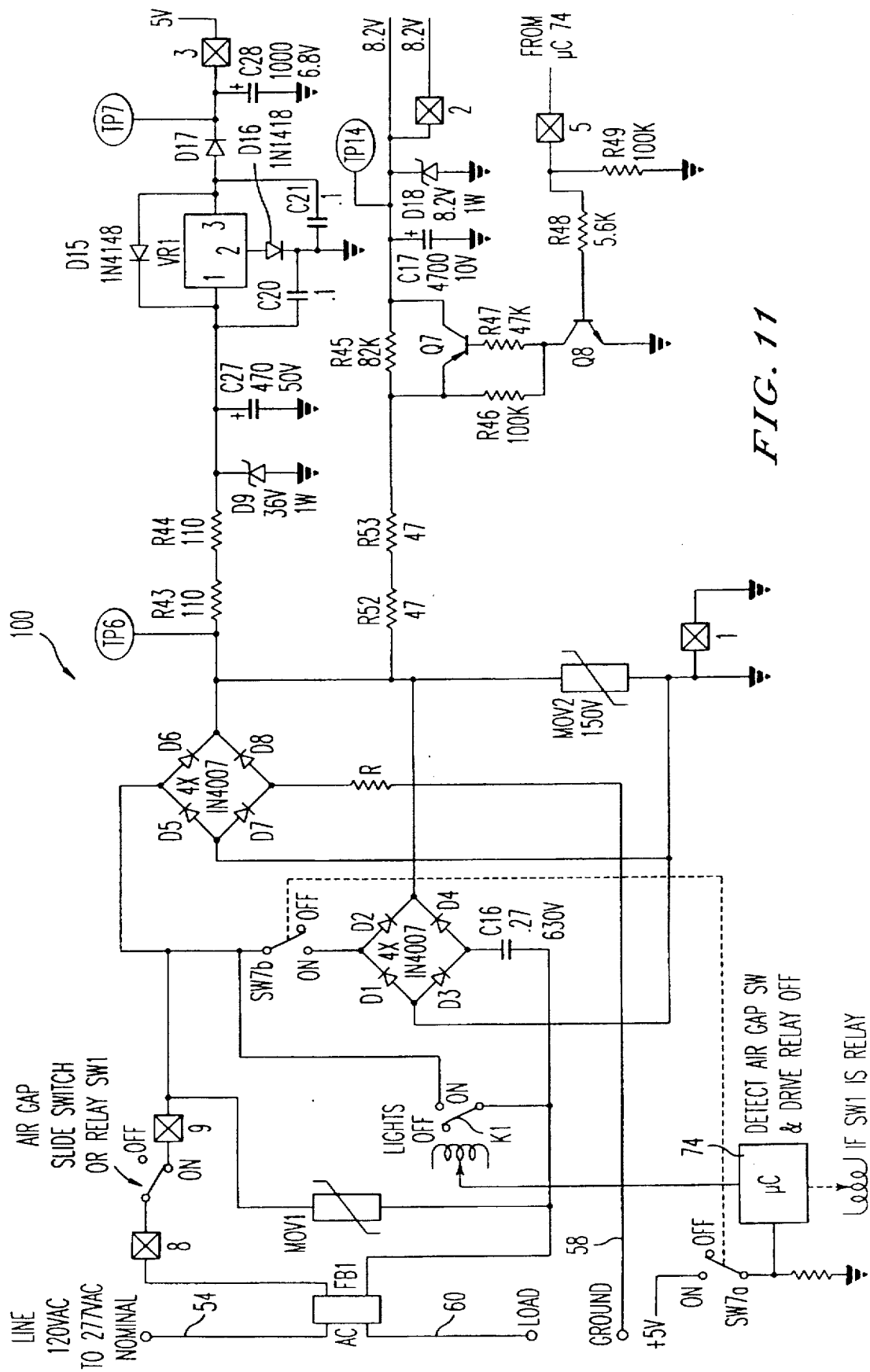

FIG. 10 depicts a power supply circuit 98 constructed in accordance with an embodiment of the invention wherein a preferably low current switch SW8 (e.g., a slide switch) is connected to an input of the microcontroller 74 to drive the relay K1 open. In FIG. 11, a power supply circuit 100 comprises an air gap switch SW9 connected to the rectifier circuit D1 through D4 and to the microcontroller 74. The microcontroller detects when the air gap switch SW9 is switched off, and, in turn, opens the relay K1. In addition, the switch SW1 in FIGS. 10 and 11 can be a relay, the reset coil for which can be activated by the microcontroller 74, as indicated by the phantom line.

Figure 12:
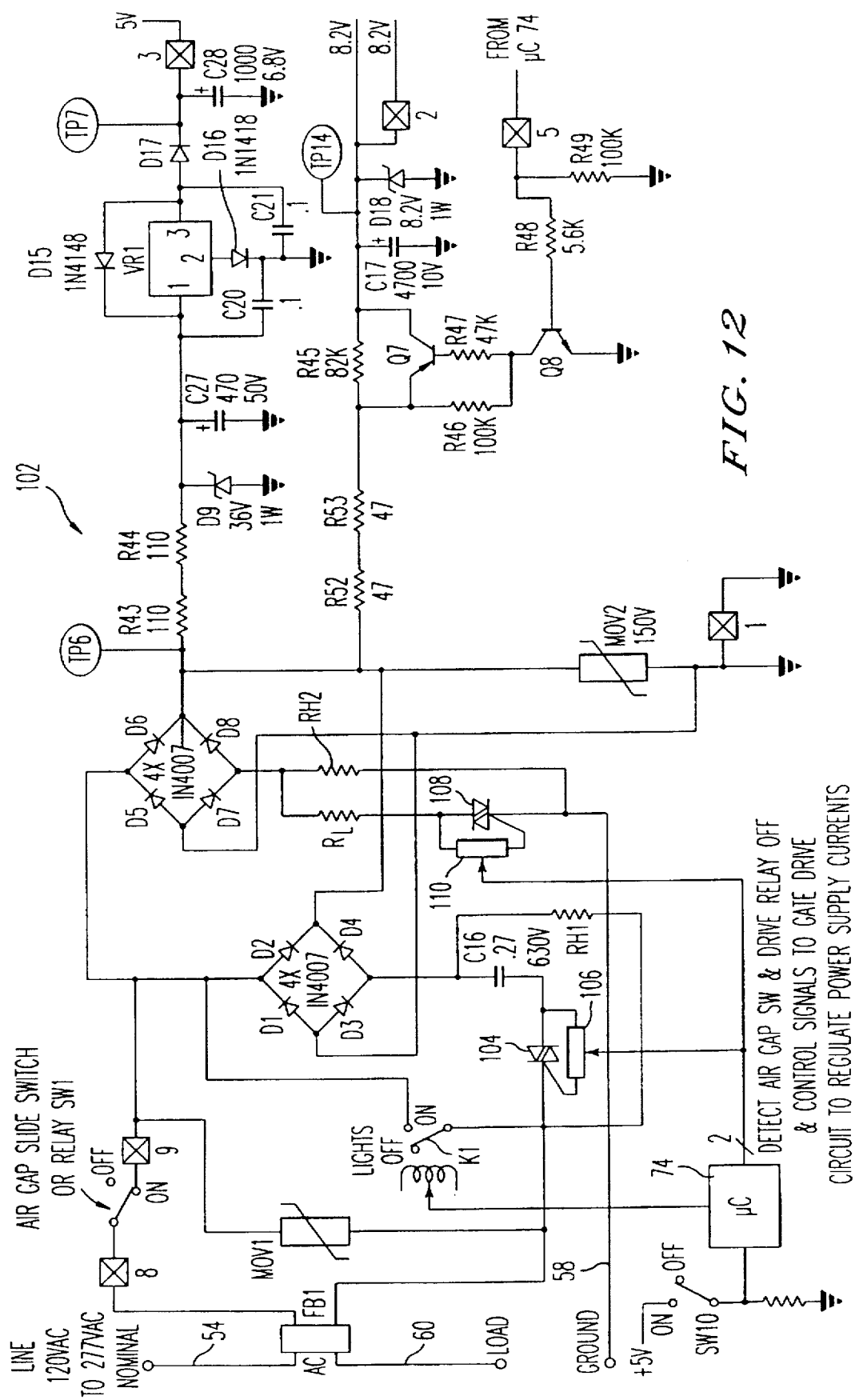

With reference to FIG. 12, a power supply circuit 102 is provided which has parallel paths, as described in connection with FIG. 9. The resistor $R_L$ and the capacitor C16, however, are in series with TRIACs 104 and 108 and gate drive circuits 106 and 110, respectively. Thus, the resistors $R_{H2}$ and $R_{H1}$ can be selected to limit current in the line to ground and line to load paths, respectively. In addition, the microcontroller 74 can regulate line to ground and line to load currents by gating the TRIACs. Further, if the microcontroller detects that an air gap switch SW10 has been activated, the microcontroller can open the relay K1.

Figure 13:
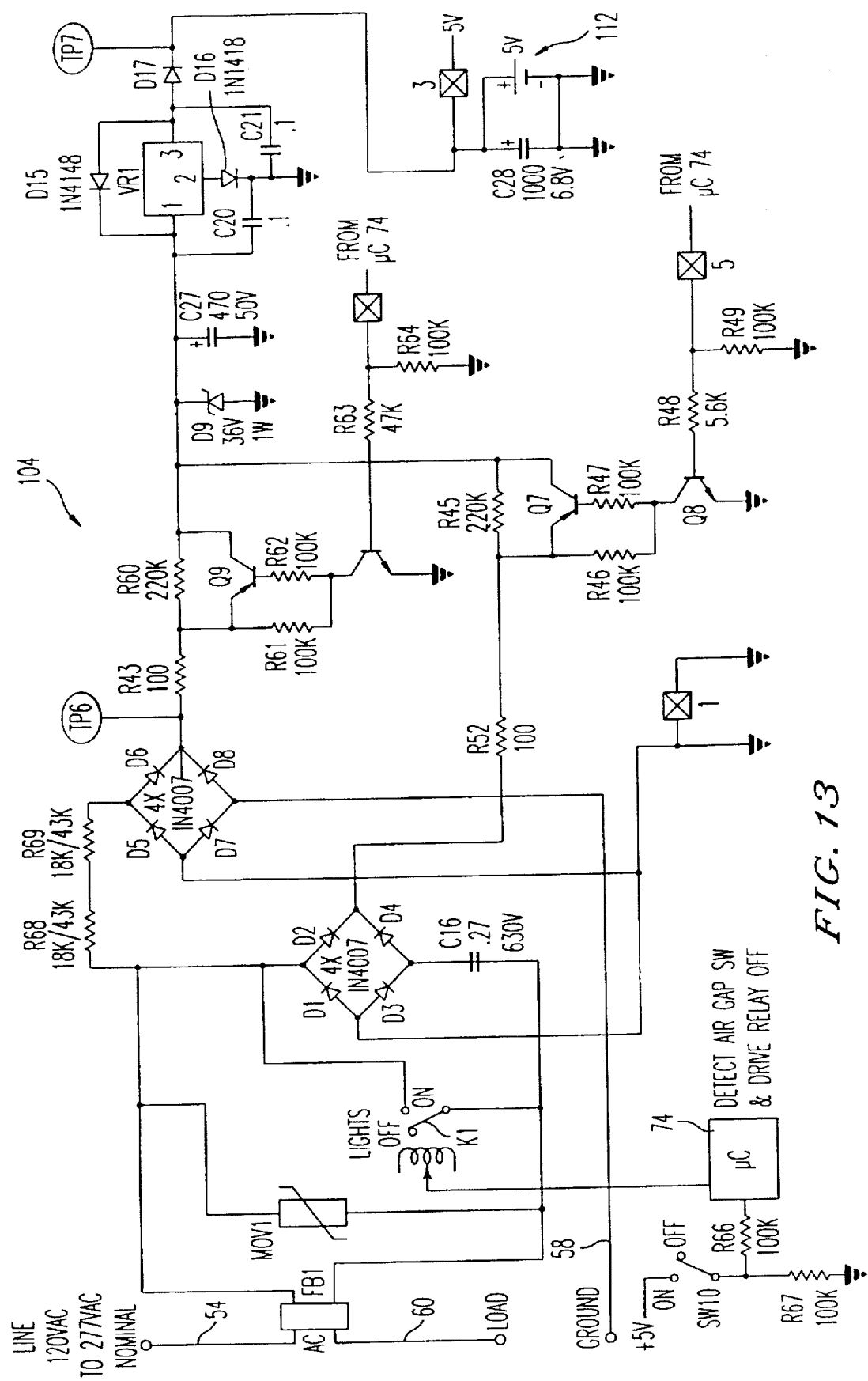

Another embodiment of the invention is depicted in FIG. 13. If the microcontroller 74 detects that an air gap switch SW10 has been activated, the microcontroller can open the relay K1. Alternatively, the air gap switch SW10 can be an electromechanical relay, and microcontroller can be programmed to open or close it. The power supply circuit is also configured to control the flow of current through resistors R60 and R45 via pulsing to selectively recharge the capacitor C27, in accordance with an embodiment of the invention.

With continued reference to FIG. 13, the resistors R68 and R69 are selected to limit current in the line to ground path to within an acceptable limit such as 0.5 milliamperes, as specified by the newly proposed UL 773A standard. A transistor Q9 is provided across the resistor R60 and is connected to a transistor Q10. The microcontroller is programmed to turn on the transistor Q10, which then turns on transistor Q9 to short the resistor R60, whenever the relay K1 is activated. This is advantageous because a substantial amount of current is used whenever the microcontroller operates the relay K1, resulting in a significantly reduced amount of current available to recharge the capacitor C27. By shorting resistor R60, an increased amount of current is permitted to flow to charge the capacitor C27 that is being depleted when the relay K1 operates.

In accordance with the embodiment of the invention depicted in FIG. 13, the microcontroller 74 can pulse the transistors Q9 and Q10 on a steady state basis, on a random basis, or as a function of the activation of components which require more current (e.g., LEDs, buzzers, and electromechanical relays). In addition, line to ground current can be limited. Thus, the microcontroller can pulse the transistors and increase current flow through resistor R60 in a variety of states and for a variety of reasons. For example, the microprocessor can pulse the transistors Q9 and Q10 during power up of the power supply circuit to more quickly obtain an initial charge. This is particularly useful for three wire power supply circuits which require a magnetizing current or are otherwise limited by 0.5 milliamperes in the line to ground current path.

The microcontroller 74 can also control the amount of current flowing through resistor R45 by pulsing the transistor Q7. While the transistors Q9 and Q10 are preferably primarily pulsed for start-up or capacitor recharging current, the transistor Q7 is pulsed for the same reasons, as well as for other functions such as operating the relay K1 and/or the air gap switch SW10. For example, if the relay K1 is open but the air gap switch is on, the transistor Q7 and the microprocessor can operate to close the relay K1 and recharge the capacitor C17 afterward. As another example, an LED can appear to be driven solid when it is actually being pulsed by pulsing transistors Q9 and Q10 to be driven on more frequently than off.

The pulsing operation of the power supply circuit 104 (FIG. 13) permits momentarily higher currents to flow in the power supply circuit for short periods of time. For example, most ground fault (GF) circuit interrupters are configured to trip when a current greater than 6.0 milliamperes flows for more than two cycles at 60 hertz. To avoid nuisance tripping, these GF circuit interrupters do not operate for currents less than 4.0 milliamperes or having duration less than approximately 5.0 seconds. Thus, the power supply circuit of the present invention can pulse as high as 3 milliamperes, for example, for less than two cycles without causing a GF circuit interrupter to trip, while maintaining current below allowed maximum levels for safety.

In accordance with another embodiment of the invention, a battery can be provided in a power supply circuit constructed in accordance with the present invention. A battery 112 is depicted, for example, in the power supply circuit shown in FIG. 13. The other power supply circuits disclosed herein can be provided with a battery as well. The battery 112 is useful because, among other reasons, wall switch units can be shipped from the manufacturer with the relay K1 open. If the air gap is switched on, there may not be sufficient energy to also switch the relay K1 closed without the battery. As another example, the relay K1 may be closed, the air gap switch switched from the ON to OFF position, and there may be insufficient energy to open the relay K1 without the battery.

Figure 14:
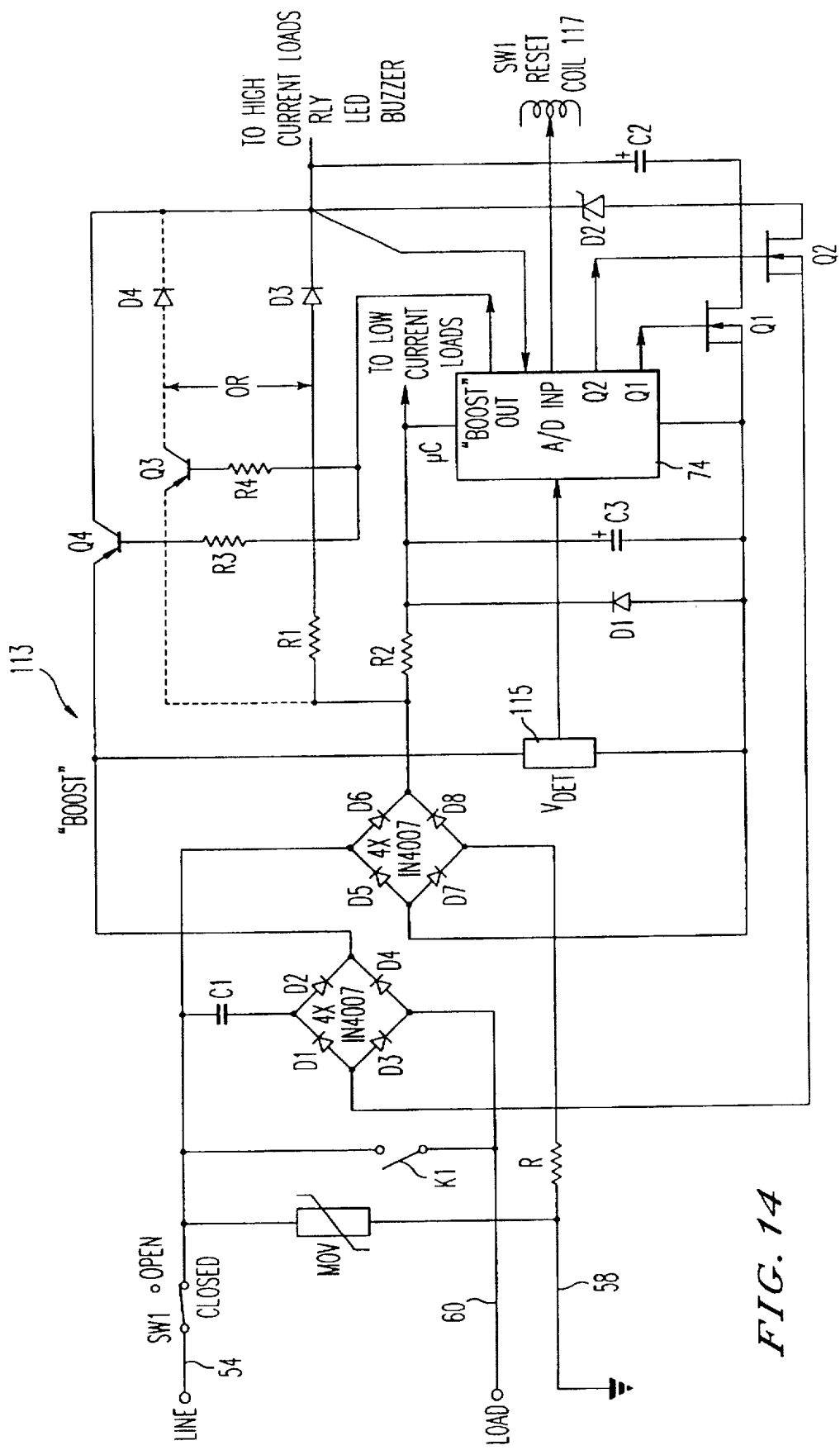

Another embodiment of the invention is depicted in FIG. 14. The power supply circuit 113 comprises a rectifier circuit D1 through D4 connected in series with a capacitor C1 across the line and load conductors 54 and 60 and therefore in parallel with the relay K1. A rectifier circuit D5 through D8 is provided between the line and ground conductors 54 and 58. The circuit preferably is powered on with the relay in the relay off or open position. The microcontroller 74 receives essentially all of the available current upon initialization via the rectifier circuit D1 through D4. In accordance with program code, the microcontroller 74 monitors and controls the flow of current to the high current load storage capacitor C2 by controlling transistors Q3 and Q4. The capacitor C2 is monitored via an analog-to-digital input on the microcontroller. The microcontroller uses transistors Q1 and Q2 to control the flow of return current for recharging the capacitor C2 via the rectifier circuit D1 through D4. The switch states of transistors Q1 and Q2 depend on the relay K1 state. Transistor Q2 is on and transistor Q1 is off when the relay K1 is open. Transistor Q1 is on and transistor Q2 is off when the relay K1 is closed. The transistors Q1 through Q4 can also be pulsed appropriately based on relay K1 and/or switch SW1 states and the unit 113 functional requirements.

With continued reference to FIG. 14, the power supply circuit 113 can be provided with an air gap switch SW1 on the line conductor 54, for example, or the load conductor 60. A voltage detection circuit 115 can be connected to the rectifier circuit D1 through D4 and to an input of the microcontroller. If relay K1 is open or not present, and a lamp load, for example, is burned open or there is a loss of power, the air gap switch SW1 can be opened automatically by a reset coil 117, which is activated by the microcontroller 74, to provide an air gap open to the load. Thus, even if a lamp load burned open prior to switching relay K1 to the OFF position, a repairman is not exposed to full AC line current (e.g., 15 amperes).

In Fig. 13, a metal oxide varistor (MOV) is provided across the line to ground conductors, as it is in FIGS. 3 and 10. In FIGS. 2, 4–9, 11 and 12, an MOV is provided across the line and load conductors. It is to be understood that in each of the embodiments of the invention, an MOV can be provided across either or both the line and ground conductors and the line and neutral conductors, as well as the neutral and ground conductors. In FIGS. 4–9, 11 and 12, an air gap switch SW1 is provided at the AC mains in addition to another air gap switch or other means for limiting current to within an acceptable level. The switch SW1 at the AC mains is provided to illustrate an alternative embodiment of the present invention and is not required in each of the power supply circuits depicted in FIGS. 4–9, 11 and 12. Ground is illustrated throughout the various views by an inverted triangle (e.g., FIG. 13) to represent a common point in the circuit; however, separate electronic circuit grounds can be used in accordance with another embodiment of the invention to control return current through the load or ground current paths. FIG. 13 illustrates separation of ground return paths.

While certain advantageous embodiments have been chosen to illustrate the invention, it will be understood by those skilled in the art that various changes and modifications can be made herein without departing from the scope of the invention as defined in the appended claims.

What is claimed is:

1. A power supply circuit for selectively connecting and disconnecting a load from an alternating current power source having neutral, line and ground conductors, said load being connected to said neutral conductor and to said power supply circuit via a load conductor, said power supply circuit comprising:
   a relay connected at one terminal thereof to said load conductor and connected at another terminal thereof to said line conductor;
   a control circuit connected to said relay and operable to open and close said relay;
   a first rectifier circuit connected in parallel with said relay and operable to supply as much as full line power to said control circuit when said relay is open; and
   a second rectifier circuit connected at one terminal thereof to said line conductor and connected at another terminal thereof to said ground conductor, said second rectifier circuit being operable to supply power to said control circuit.

2. A power supply circuit as claimed in claim 1, wherein said first rectifier circuit comprises a bridge rectifier and a capacitor connected in series with respect to each other and in parallel with respect to said relay, said bridge rectifier being connected to said line conductor at a first terminal, to said capacitor at a second terminal, and to said control circuit at third and fourth terminals thereof.

3. A power supply circuit as claimed in claim 1, wherein said second rectifier circuit comprises a bridge rectifier in series with at least one resistor.

4. A power supply circuit as claimed in claim 1, wherein said second rectifier circuit is configured to limit current from said line conductor to said ground conductor to a predetermined maximum current level.

5. A power supply circuit as claimed in claim 1, further comprising an air gap switch connected to said line conductor and operable to interrupt the current path from said power source to said load when open.

6. A power supply circuit as claimed in claim 1, wherein said control circuit comprises:
   a resistor connected to said first rectifier circuit;
   a capacitor connected to said resistor;
   a switch connected in parallel with said resistor and having substantially less impedance when activated; and
   a processor circuit to selectively activate said switch to shunt said resistor and charge said capacitor.

7. A power supply circuit as claimed in claim 6, wherein said processor circuit is programmable to activate said switch in accordance with at least one of a group of conditions consisting of a fixed duty cycle, a varying duty cycle, random intervals, and following operation of said relay.

8. A power supply circuit as claimed in claim 6, further comprising an indicator, said processor circuit being programmable to activate said switch in response to operation of said indicator.

9. A power supply circuit as claimed in claim 6, wherein said processor circuit is programmable to activate said switch to operate said relay.

10. A power supply circuit as claimed in claim 6, further comprising an air gap switch connected to at least one of said line conductor and said neutral conductor and operable to interrupt the current path from said power source to said load when open, said processor circuit being programmable to activate said switch to operate said air gap switch.

11. A power supply circuit as claimed in claim 1, wherein said control circuit comprises:
   a resistor connected to said second rectifier circuit;
   a capacitor connected to said resistor;
   a switch connected in parallel with said resistor and having substantially less impedance when activated; and
   a processor circuit to selectively activate said switch to shunt said resistor and to charge said capacitor.

12. A power supply circuit as claimed in claim 11, wherein said processor circuit is programmable to activate said switch in accordance with at least one of a group of conditions consisting of a fixed duty cycle, a varying duty cycle, random intervals, and following operation of said relay.

13. A power supply circuit as claimed in claim 11, further comprising an indicator, said processor circuit being programmable to activate said switch in response to operation of said indicator.

14. A power supply circuit as claimed in claim 11, wherein said processor circuit is programmable to activate said switch to operate said relay.

15. A power supply circuit as claimed in claim 11, further comprising an air gap switch connected to at least one of said line conductor and said neutral conductor and operable to interrupt the current path from said power source to said load when open, said processor circuit being programmable to activate said switch to operate said air gap switch.

16. A power supply circuit as claimed in claim 1, further comprising an air gap switch connected to said neutral conductor and operable to interrupt the current path from said power source to said load when open.

17. A power supply circuit as claimed in claim 1, further comprising a switch connected in series with said relay and said line conductor, and an air gap off detection circuit connected to said switch when said switch is open and to said control circuit, said air gap off detection circuit being operable to close said relay when said switch is open.

18. A power supply circuit as claimed in claim 17, wherein said switch comprises a first set of contacts connected in series with said relay, and a second set of contacts connected in series with said second rectifier circuit, said switch being operable to disconnect said power supply circuit from said power source when open, said air gap off detection circuit being operable to detect decreasing voltage and to open said relay in response thereto.

19. A power supply circuit as claimed in claim 17, further comprising a third rectifier connected between said switch and said load when said switch is open, said air gap off detection circuit being operable to detect increasing voltage and to open said relay in response thereto when said switch is open.

20. A power supply circuit as claimed in claim 1, further comprising a switch connected in series with said first rectifier circuit and in parallel with said relay, and an air gap off detection circuit connected to said switch when said switch is open and to said control circuit, said air gap off detection circuit being operable to open said relay when said switch is open.

21. A power supply circuit as claimed in claim 20, wherein said switch comprises a first set of contacts connected in series with said first rectifier circuit and in parallel with said relay, and a second set of contacts connected in series with said second rectifier circuit, said switch being operable to disconnect said power supply circuit from said power source when open, said air gap off detection circuit being operable to detect decreasing voltage and to open said relay in response thereto.

22. A power supply circuit as claimed in claim 20, further comprising a third rectifier connected between said switch and said load when said switch is open, said air gap off detection circuit being operable to detect increasing voltage when said switch is open and to open said relay in response thereto.

23. A power supply circuit as claimed in claim 1, further comprising a variable impedance circuit element connected in series with said second rectifier circuit and said ground conductor, said control circuit being operable to control the amount of impedance across said variable impedance circuit element.

24. A power supply circuit as claimed in claim 23, wherein said control circuit comprises at least one of a plurality of control elements comprising a processor circuit and a potentiometer.

25. A power supply circuit as claimed in claim 23, wherein said variable impedance circuit element is a thyristor and said control circuit comprises a processor circuit and a gate drive circuit, said gate drive circuit being connected in parallel with said thyristor and controllable by said processor circuit.

26. A power supply circuit as claimed in claim 23, further comprising a switch in series with said variable impedance circuit element, and a resistor connected in parallel with said switch and said variable impedance circuit element, said control circuit comprising a processor circuit which is operable to close said switch and increase and decrease the impedance of said variable impedance circuit element with respect to the impedance of said resistor.

27. A power supply circuit as claimed in claim 1, further comprising a variable impedance circuit element connected in series with said first rectifier circuit and said load, said control circuit being operable to control the amount of impedance across said variable impedance circuit element.

28. A power supply circuit as claimed in claim 27, wherein said control circuit comprises at least one of a plurality of control elements comprising a processor circuit and a potentiometer.

29. A power supply circuit as claimed in claim 27, wherein said variable impedance circuit element is a thyristor and said control circuit comprises a processor circuit and a gate drive circuit, said gate drive circuit being connected in parallel with said thyristor and controllable by said processor circuit.

30. A power supply circuit as claimed in claim 27, further comprising a switch in series with said variable impedance circuit element, and a resistor connected to said first rectifier circuit and providing a parallel path with respect to said switch and said variable impedance circuit element, said control circuit comprising a processor circuit which is operable to close said switch and increase and decrease the impedance of said variable impedance circuit element with respect to the impedance of said resistor.

31. A power supply circuit as claimed in claim 1, wherein said control circuit comprises a processor circuit and further comprising a switch connected to said processor, said processor being operable to detect when said switch is activated and to open said relay in response thereto.

32. A power supply circuit as claimed in claim 31, wherein said switch comprises one set of contacts connected to said processor circuit and another set of contacts connected in series with said first rectifier circuit, said processor being operable to detect a voltage drop across said first rectifier circuit when said switch is open.

33. A power supply circuit as claimed in claim 1, further comprising a resistor connected to said second rectifier circuit, a capacitor connected in series with said resistor, a transistor connected across said resistor, said control circuit being operable to gate said transistor to decrease the impedance across said resistor and charge said capacitor.

34. A power supply circuit as claimed in claim 1, wherein said control circuit comprises a processor circuit, and further comprising a capacitor and at least one switch connected to said processor circuit, said processor circuit being operable to control the flow of current to said capacitor via said first rectifier circuit and said at least one switch.

35. A power supply circuit as claimed in claim 1, further comprising a first ground circuit connected to at least one of said load and said first rectifier circuit and a second ground circuit connected to at least one of said ground conductor and said second rectifier circuit to provide first and second ground return paths, respectively.

36. A power supply circuit as claimed in claim 1, further comprising a voltage detection circuit connected to said first rectifier circuit, and an air gap switch connected to at least one of said line conductor and said load conductor, said voltage detection circuit being operable to detect a decrease in voltage when said relay is open and said load is open and to open said air gap switch to interrupt current flow to said load in response thereto.

* * * * *